United States Patent [19]

Specktor et al.

[11] Patent Number: 4,718,691
[45] Date of Patent: Jan. 12, 1988

[54] DEVICE FOR ADJUSTING TOE OF A VEHICLE WHEEL

[75] Inventors: John Specktor, Golden Valley; Gerald A. Specktor, St. Paul, both of Minn.

[73] Assignee: Shim-A-Line, Inc., Minneapolis, Minn.

[21] Appl. No.: 896,637

[22] Filed: Aug. 15, 1986

[51] Int. Cl.⁴ ............................................. B62D 17/00
[52] U.S. Cl. ..................................... 280/661; 280/673
[58] Field of Search .................... 280/661, 96.1, 673

[56] References Cited

U.S. PATENT DOCUMENTS

| | | | |
|---|---|---|---|
| 3,357,661 | 12/1967 | Aakjar | 280/661 |
| 3,880,444 | 4/1975 | Bridges | 280/661 |
| 4,057,120 | 11/1977 | Roetlisberger | 280/661 |
| 4,400,008 | 8/1983 | Rumpel | 280/666 |
| 4,420,272 | 12/1983 | Ingalls et al. | 280/661 |
| 4,424,984 | 1/1984 | Shiratori et al. | 280/661 |
| 4,453,733 | 6/1984 | Sautter et al. | 280/661 |
| 4,456,282 | 6/1984 | Rumpel | 280/690 |
| 4,457,536 | 7/1984 | Rumpel | 280/663 |
| 4,457,537 | 7/1984 | von der Ohe et al. | 280/675 |
| 4,458,913 | 7/1984 | Rumpel | 280/663 |
| 4,458,918 | 7/1984 | Rumpel | 280/719 |
| 4,462,609 | 7/1984 | von der Ohe | 280/690 |
| 4,478,430 | 10/1984 | Maebayashi et al. | 280/690 |
| 4,480,852 | 11/1984 | Rumpel | 280/663 |
| 4,493,493 | 1/1985 | Satchell et al. | 280/661 |
| 4,511,160 | 4/1985 | Inoue | 280/701 |
| 4,515,391 | 5/1985 | Koide | 280/690 |
| 4,529,222 | 7/1985 | Kisima et al. | 280/701 |
| 4,530,514 | 7/1985 | Ito | 280/701 |
| 4,616,845 | 10/1986 | Pettibone | 280/661 |

*Primary Examiner*—John J. Love
*Assistant Examiner*—Kenneth R. Rice
*Attorney, Agent, or Firm*—Kinney & Lange

[57] ABSTRACT

A device is used to adjust toe angle of a vehicle wheel connected to a car by a suspension system having at least one control arm transversely disposed to the longitudinal axis of the vehicle. The control arm is attached to the wheel at one end and pivotally attached to an underside of the vehicle at another end by a bolt. The device displaces the bolt of the control arm from its original position, thereby adjusting the toe angle of the wheel.

26 Claims, 9 Drawing Figures

DEVICE FOR ADJUSTING TOE OF A VEHICLE WHEEL

BACKGROUND OF THE INVENTION

1. Field of the Invention

The present invention relates to devices for adjusting toe angle of a vehicle wheel, and in particular, it relates to a device used in a suspension system having at least one control arm that controls the toe angle of the wheel, the device displacing the control arm to adjust the toe angle.

2. Description of the Prior Art

There has been a general trend in the manufacture of automobiles to make automobiles lighter. To further accomplish this end, conventional axles and suspensions are being eliminated and strut-type suspensions, such as the McPherson-type suspension, are being used more and more.

One type of strut suspension used by the Ford Motor Company in their Tempo and Topaz brand automobiles uses two spaced-apart front and rear control arms to hold the wheels in a selected toe angle. Toe angle, as used in the present application, is defined as the side-to-side slant of the tires along their forward portion and referenced from a line positioned along an axis common to the front and rear tires. The front and rear control arms are attached at their outer ends to the wheels and are pivotally attached at their inner ends to the underside of the vehicle. The inner ends are positioned between two plates that extend downwardly from the underside of the vehicle and a pin or bolt extends through the plates and through the inner end of the control arm. If the toe angle of the wheels has been altered due to an accident, or is in error due to factory assembly, readjustment of the wheels to the proper toe angle is not readily possible.

SUMMARY OF THE INVENTION

The present invention includes a device for adjusting toe angle of a vehicle wheel carried by a strut-type suspension. The strut-type suspension includes at least one control arm disposed substantially transversely to the longitudinal axis of the vehicle. The control arm is attached at one end to the wheel and pivotally attached at another end to the underside of the vehicle. The device of the present invention displaces the bolt of the control arm thereby adjusting the toe angle of the vehicle.

In one type of arrangement, two parallel mounting plates which are disposed transversely to the longitudinal axis and extend downwardly from the underside of the vehicle. An end of the control arm is positioned between the two mounting plates and is attached to the underside of the vehicle by a bolt or pin extending through apertures of the two mounting plates and a bore in the end of the control arm. To adjust toe angle, the bolt is removed. The device of the present invention has a portion for engaging the aperture of one of the mounting plates and has an aperture which is offset from the aperture of the mounting plate. The control arm is reattached by inserting the bolt through the offset aperture of the device and then through the bore of the control arm and the aperture of the other mounting plate. The device displaces the bolt angularly from its original position, displacing the control arm, and thereby adjusting the toe angle of the wheel. If two devices are used, one for each mounting plate, then the bolt is displaced parallel from its original position.

DETAILED DESCRIPTION OF THE PREFERRED EMBODIMENTS

Figure 1:
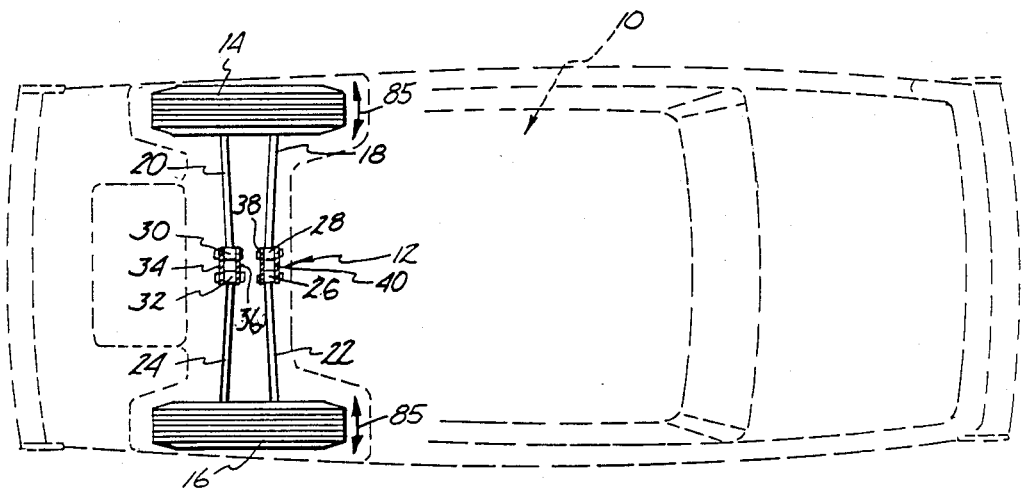
FIG. 1 is a plan view illustrating aa vehicle having a pair of nondriven rear wheels whose toe angle is retained by a pair of control arms.

The present invention includes a device and method for adjusting toe angle of a vehicle wheel having a pair of transversely-disposed control arms for controlling the toe angle. Referring now to FIG. 1, a motor vehicle is generally indicated in broken lines at 10. The motor vehicle 10 is a front-wheel drive vehicle with the front wheels not being shown and the rear wheels indicated generally at 12. The rear wheels 12 are non-driven wheels and are independently suspended. Typically, such wheels are suspended by a strut-type suspension which is well known in the art. The wheels include individual left road wheel 14 and right road wheel 16.

The toe angle of the road wheel 14 is retained by a left front control arm 18 and a left rear control arm 20. Similarly, the toe angle of the wheel 16 is retained by a right front control arm 22 and right rear control arm 24. Each control arm is pivotally attached to a wheel spindle (not shown) of the respective road wheel at an outer end. Each of the control arms are attached to the vehicle 10 at inner ends 26, 28, 30 and 32. The inner ends 26 and 28 of the front control arms are positioned between a front mounting plate 40 and a rear mounting plate 38. Similarly, the inner ends 30 and 32 of the rear control arms 20 and 24 are positioned between a front mounting plate 36 and a rear mounting plate 34. The mounting plates 34 and 36, and the mounting plates 38 and 40 are disposed substantially parallel to each other and transversely to the longitudinal axis of the vehicle. The mounting plates are fixedly attached to the underside of the vehicle, such as to a unitized body chassis that is common in present-day vehicles.

Figure 2:
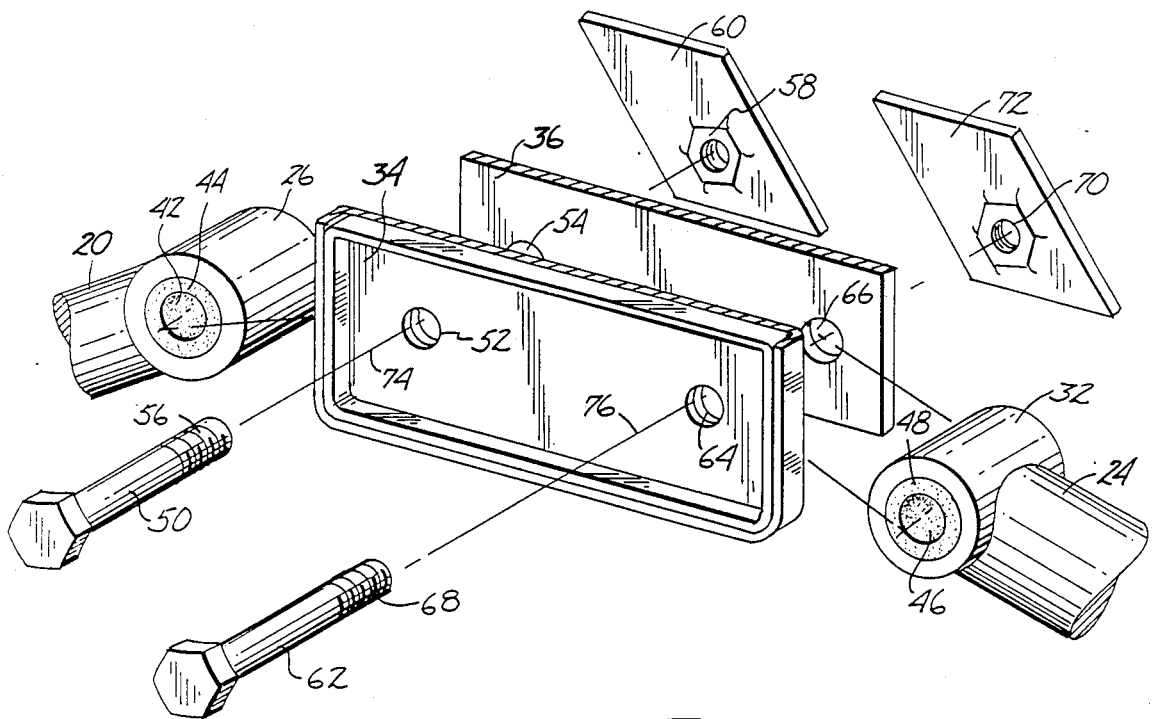
FIG. 2 is an exploded perspective view illustrating the manner in which the control arms are connected to the vehicle.

The pivotal connection of the control arms to the vehicle is best illustrated in FIG. 2 where the pivotal connection of the control arms 20 and 24 is illustrated in an exploded view. Since the pivotal connection of the front control arms is similar to the rear control arms, only the rear controls arms will be described. The end portion 30 of the left rear control arm 20 includes a bore 42 lined with a resilient bushing 44. The end portion 32 also includes a bore 46 lined with a resilient bushing 48.

The control arm 20 is pivotally attached to the mounting plates 34 and 36 by a bolt 50 extending through an aperture 52 in the mounting plate 34, then through the bore 42 and through an aperture 54 in the mounting plate 36. A threaded end portion 56 of the bolt is engaged by a nut 58 contained by a harness 60. Similarly, the control arm 24 is pivotally attached to the mounting plates 34 and 36 by a bolt 62 extending through an aperture 64 in the mounting plate 34, and then through the bore 46 of the end portion 32, and then through an aperture 66 in the mounting plate 36. A threaded end portion 68 of the bolt 62 is engaged by a nut 70 contained by a harness 72.

The control arm 20 pivots about an axis 74 defined by the position of the bolt 50 as installed in the factory. Similarly, the control arm 24 pivots about an axis 76 defined by the position of the bolt 62 as installed in the factory.

As stated previously, a problem exists in adjusting the toe angle if the vehicle becomes involved in an accident. In most cases, the control arms as installed by the manufacturer do not include a mechanism for adjusting toe angle.

Figure 3:
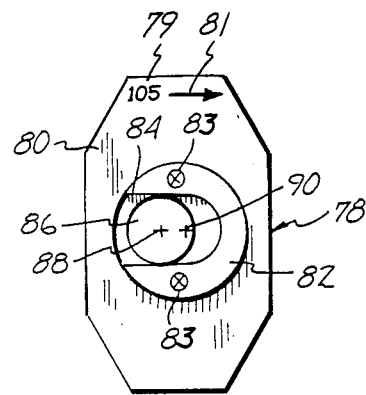
FIG. 3 is a front elevational view of a device of the present invention.
Figure 4:
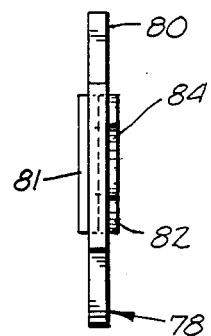
FIG. 4 is a side view of the device of FIG. 3.

A preferred embodiment of the device of the present invention is indicated at 78 in FIGS. 3-6. As illustrated in FIGS. 3 and 4, the device 78 includes a main plate member 80 preferably of an octogonal configuration, an aperture-engaging portion 81 and a bolt engaging member 82, as best illustrated in FIGS. 3 and 4. The portion 81 is preferably a circular disk portion being formed by stamping the plate member 80 such that the disk portion extends outwardly therefrom. The member 82 is attached by screws 83 or can be welded to the plate 80. The member 82 is preferably a circular plate with a center 90 and a slot 84 extending through the center of the member. The slot 84 ends in an arcuate wall 86. An aperture 86 having a diameter substantially equal to or greater than the bolts 50 and 62, and having a center 88 is drilled through the portion 81 such that the center 88 is offset from the center 90. The member 82 is positioned on the plate 80 such that the aperture 86 is aligned with the slot 84.

In another aspect of the present invention, the device 78 includes indicia located on the plate member 80, as illustrated in FIG. 3. The indicia include part number indicia 79 and direction indicia 81. The part number indicia 79 indicate the distance of the offset, in other words, the distance of the center 88 from the center 90. In the working embodiment described in the present application, a number of devices 78 are provided for use, with the centers 88 offset from the center 90 in increments of 1/64 inch. In the part number indicia 79, the last number, the number on the right, indicates the number of 1/64 inch increments that the center 88 is offset from the center 90. In the example in FIG. 3, the number 5 indicates that the center 88 is offset from the center 90 by 5/64 inch. The directional indicia 81, which is an arrow in the example given, indicates the direction in which toe of the wheel is adjusted, as indicated by arrows 85 in FIG. 1. It should be noted that the arrow 81 points in the opposite direction of the offset from the center 90, which is the direction that the forward portion of the wheel is moved. It should be further noted that if the device 78 is turned 180° to produce the offset in an opposite direction from the center 90, the indicia 79 and 89 will be at the lowermost position of the device, and the arrow 81 will correctly point to the direction in which the front of the wheel, as indicated by arrows 85 in FIG. 1, will move.

Figure 5:
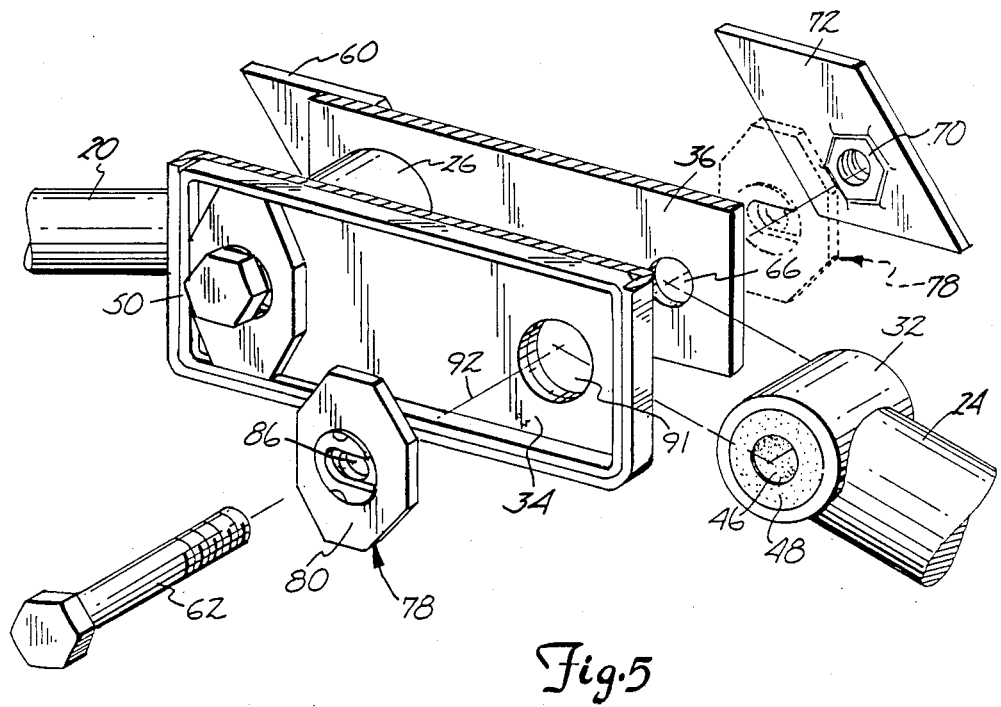
FIG. 5 is an exploded perspective view illustrating how the device of FIGS. 3 and 4 is used to adjust toe angle.
Figure 6:
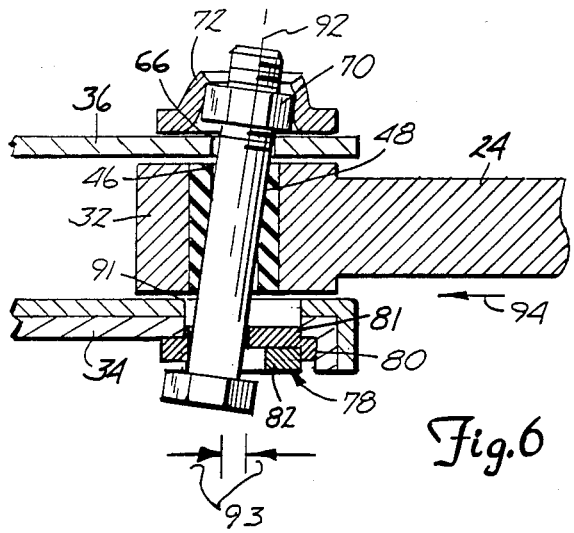
FIG. 6 is a sectional view of the device of FIGS. 3 and 4 illustrating the device with the bolt being angularly displaced and the control arm being moved.

Referring to FIGS. 5 and 6, where the device 78 is illustrated in use, for example, to correct toe adjustment on wheel 16. One of the control arms 20 or 24 is disconnected from its mounting to the underside of the vehicle. In the example discussed, control arm 24 is disconnected, as illustrated in FIG. 5, by disconnecting the bolt 62 from the nut 70 and removing the bolt from the apertures 65, 66 and the bore 46 of the arm 24. The aperture 64 is then drilled out to form a larger aperture 91 substantially equal to the diameter of the portion 81. In the case of a Ford Tempo or Topaz, the original aperture is at least three-eighths inch (⅜") diameter to accommodate a ⅜" bolt. The aperture 64 is the present example is drilled out to three-quarters inch (¾") diameter to accommodate the member 81 which is also ¾" in diameter. The device 78 is then placed alongside the plate 34 with the member 81 inserted into the aperture, as best illustrated in FIG. 6. The bolt 62 is then inserted through the apertures 86 and 91, through the bore 48 of the control arm 24 and the aperture 66 to threadably engage the nut 70. The member 82 provides a surface for the head of the bolt 62 to rest. Since the center 88 of the aperture 86 is offset from the center 90 of the member 82, the bolt 62 is offset from the original axis 76 illustrated in FIG. 2 to a new axis 92. The bolt 62 is displaced along the new axis 92 angularly from the original axis 76 a preselected distance through the use of the device 78 as indicated by reference character 93. The flexible sleeve 48 permits the bolt 62 to be angularly disposed within the bore 46. Since the bolt 62 has been moved, the control arm 24 is also moved a preselected distance in a direction of arrow 94. By moving the one control arm 24 a preselected distance, the toe angle of the wheel 16 is adjusted a preselected value.

Preferably, a set of the devices 78 is provided to the user. The set includes a plurality of the devices with each device in the set having the center of the aperture 86 offset from the center of the member 82 an incrementally larger amount. For example, in the first device of the set, the aperture 86 is offset from the center 90 1/32 of an inch. The next device is offset 3/64 of an inch or 1/64 of an inch more than in the first device. Each device thereafter is offset an additional increment of 1/64 of an inch. Nine such devices have been found to be sufficient to provide an adequate range to adjust the toe angle in a Ford Tempo or Topaz back to the manufacturer's suggested toe angle.

The bolt 62 can also be offset parallel to the original axis 76. The aperture 66 of the plate 36 can also be redrilled as the aperture 64, and the device 78' (indicated in broken lines in FIG. 5) inserted therein. The bolt 62 is then displaced along a new axis that is substantially parallel to the old axis, thereby moving the control arm and adjusting the toe angle.

In addition, if both control arms 24 and 22 were adjusted using the device 78 of the present invention with one device having a greater offset than the other device, camber of the wheel may alos be adjusted.

Figure 7:
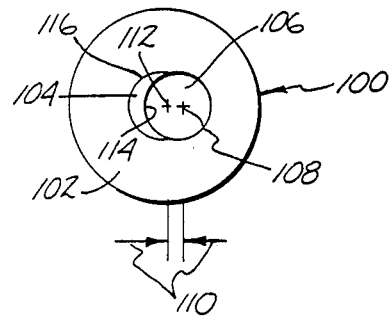
FIG. 7 is an elevational view of an alternative embodiment of the device of the present invention.
Figure 8:
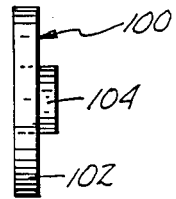
FIG. 8 is a side view of the alternative embodiment of FIG. 7.
Figure 9:
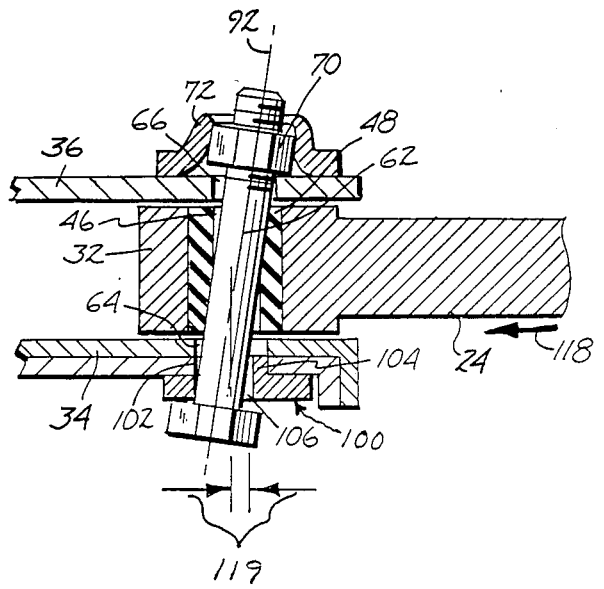
FIG. 9 is a sectional view showing the device of FIGS. 7 and 8 in use.

An alternative embodiment of the present invention is generally indicated at 100 in FIGS. 7-9. The device 100 includes a primary plate 102 and an aperture-engaging member 104. The plate 102 is preferably of a generally circular configuration, although any configuration is suitable. The plate 102 includes an aperture 106 having a center 108. The aperture-engaging member 104 also includes a center 112. The center 108 is offset from the center 112. The aperture 106 has a diameter sufficient to permit passage of the bolt 62. The member 104 is of a crescent-shaped configuration having an inner surface 114 adjacent the aperture 106 and an outer surface 116 for engaging the wall of the aperture 64. The surface 116 has approximately the same arc as the wall of the aperture 64.

In FIG. 9, the device 100 is shown in use. The bolt 62 is disengaged from the nut 70 and removed from the apertures 64, 66 and the bore 48 of the control arm 24. The member 104 of the device 100 is then inserted into the aperture 64 of the plate 34. The member 104 is positioned against the wall of the aperture 65 such that the aperture 106 of the device 100 is partially blocked by a portion of the plate 34. Using the aperture 106 as a guide, the portion of the plate 34 blocking the aperture 106 is then drilled out using a ⅜" drill (which is approximately the diameter of the bolt 62). After drilling out the portion of the plate 34 blocking the aperture 106, the bolt 62 is then inserted through the aperture 106, the newly drilled-out portion of the plate 36 and aperture 64 through the bore 46 of the arm 24 and through the aperture 66 of the plate 36 for threadable engagement with the nut 70. Since the center of the aperture 106 is offset from the center 112 (which lies along the original axes 76 illustrated in FIG. 2), the bolt is displaced angularly to a new axis 92. The flexible sleeve 48 permits the bolt 62 to be angularly disposed. Since the bolt 62 has been moved, the control arm 24 is also moved a preselected distance in a direction of arrow 118 and as indicated by reference character 119. By moving the one control arm 24 a preselected distance, the toe angle of the wheel 16 is adjusted a preselected value.

Similar to the device 78, a set of the devices 100 is provided to the user for adjusting toe angle. The set includes a plurality of the devices with each device in the set having the center of the aperture 116 offset from the center 112 of the member 104 an incrementally larger amoaunt. For example, in the first device of the set, the center 108 of the aperture 106 is offset from the center 112 by 1/32 of an inch. The center 108 of the aperture 106 in the next device is offset 3/64 of an inch, or 1/64 of an inch more than in the first device, from the center 112. The center 108 of the aperture 106 in each devcie thereafter is offset an additional increment of 1/64 of an inch. Again, similar to the device 78, nine of the devices 100 have been found to be sufficient to provide an adequate range to adjust the toe angle in a Ford Tempo or Topaz back to the manufacturer's suggested toe angle.

The device 100, similar to the device 78, can be used to displace the bolt to a new axis substantially parallel to the old axis by attaching the device to both plates 34 and 36. In addition, placing the device 100 in plates 34, 36, 38 and 40, moving both control arms can also adjust the camber of the wheel.

In summary, the device of the present invention provides a simple manner to adjust the toe angle of a wheel wherein the toe angle is retained by a pair of transversely-disposed control arms. A minimum amount of alteration to the mounting plates is required to use the device of the present invention for adjusting the toe angle.

The device of the present invention further provides a permanent and stronger connection between the control arms and the mounting plate than the original equipment design.

Although the present invention has been described with reference to preferred embodiments, workers skilled in the art will recognize that changes may be made in form and detail without departing from the spirit and scope of the invention.

What is claimed is:

1. A device for adjusting toe angle of a wheel attached to a vehicle by a suspension system that includes at least one control arm attached to the vehicle by an end having a bore transversely disposed therein with respect to the axis of the control arm, said end being disposed between first and second mounting means attached to the underside of the vehicle and a bolt extending through first and second apertures of the first and second mounting means, respectively, and through the bore of the control arm along a first axis, the device comprising:

a base having a third aperture with a first center;
engaging means extending outwardly from the base for engaging the first aperture, the engaging means having an outer arcuate surface that secures against an inner curvature of the first aperture thereby centering the third aperture a preselected distance from the first axis; wherein the bolt extends through the first aperture, the bore and the second aperture such that the bolt lies along a second axis disposed from the first axis.

2. The device of claim 1 wherein the engaging means retains the base in a position such that the third aperture is coaxially disposed on the second axis.

3. The device of claim 2 wherein the means for engaging is a disk with the third aperture extending therethrough.

4. The device of claim 1 containing indicia which provide an indication as to the direction in which the toe angle of the wheel is adjusted.

5. The device of claim 4 wherein the indicia include an arrow pointing in a direction opposite of the offset to indicate the direction in which the toe angle is adjusted.

6. A method for adjusting toe angle of a wheel attached to a vehicle by a suspension system that includes at least one control arm attached to the vehicle by an end having a bore transversely disposed therein with respect to the axis of the control arm, said end being disposed between first and second mounting means attached to the underside of the vehicle and a bolt extending through first and second apertures of the first and second mounting means, respectively, and through the bore of the control arm along a first axis, the method comprising:

disconnecting the control arm from the mounting means by removing the bolt;
positioning a device having edge portions that engage a rim of the mounting means such that the device is retained in position, the device having a member with an engaging portion extending outwardly from the device having an outer arcuate surface wherein the outer arcuate surface of the engaging portion secures against the inner curvature of the first aperture the member having a third aperture that lies along a second axis; and
reconnecting the control arm by inserting the bolt through the third aperture and through the bore and through the second aperture to reconnect the control arm to the mounting plates such that the second axis is disposed from the first axis.

7. The method of claim 6 and further including drilling out the first aperture to a larger diameter wherein the engaging portion is a disk of approximately the same diameter as the drilled out first aperture and whose center is offset from the center of the third aperture.

8. The method of claim 6 wherein the engaging portion of the member is a crescent-shaped plate whose outer arc has a radius with a center offset from the third aperture and further including positioning the crescent-shaped plate against a wall surface of the first aperture; and drilling out any portion of the first mounting plate obstructing the third aperture so that the bolt can be inserted through the third aperture, through the bore and through the second aperture.

9. A mechanism for adjusting toe angle of a wheel attached to a vehicle by a suspension system that includes first and second control arms attached to the vehicle by respective ends each end having a bore transversely disposed therein with respect to the axis of the respective control arm, each end being disposed between first and second mounting means attached to the underside of the vehicle by first and second bolts, respectively, each bolt extending through respective first and second apertures of the first and second mounting means, respectively, and through the bore of the respective control arm along a first axis, the first aperture having an inner arcuate surface, the mechanism comprising:
   first base means having edge portions that engage a rim of the first mounting means such that the first base means is retained in position, the first base means having a third aperture with a first center and a first engaging means having an outer arcuate surface for engaging the first base means in an adjoining manner with the first aperture of the first mounting means of the first control arm, the outer arcuate surface of the first engaging means abutting against the inner arcuate surface of the first aperture thereby centering said third aperture a preselected distance from the first axis of the first control arm; and
   wherein the first bolt extends through the third aperture, the bore of the first control arm and the second aperture of the second mounting means of the first control arm such that the first bolt lies along a second axis angularly disposed from the first axis.

10. The mechanism of claim 9 wherein the first engaging means includes a crescent-shaped plate having an outer arcuate surface, the outer arcuate surface having a second center offset from the first center of the third aperture, the outer arcuate surface engaging the inner arcuate surface engaging the inner arcuate surface of the first aperture of the first mounting plate of the first control arm for retaining the first base means in a position such that the third aperture is coaxially disposed on the second axis.

11. The mechanism of claim 9 and further including:
   a second base means having a fourth aperture with a second center and a second means for insertion into the first aperture of the first mounting means of the second control arm and for centering said fourth aperture a preselected distance from the first axis of the second control arm; and
   wherein the second bolt extends through the fourth aperture, the bore of the second control arm and the second aperture of the second mounting means of the second control arm such that the second bolt lies along a third axis disposed from the first axis of the second control arm.

12. The mechanism of claim 11 wherein the second means for insertion includes a second member having a surface for engaging a wall of the first aperture of the first mounting plate of the second control arm for retaining the second base means in a position such that the fourth aperture is coaxially disposed on the third axis.

13. The mechanism of claim 9 wherein the first engaging means is a disk with the third aperture extending therethrough.

14. The mechanism of claim 9 wherein the first engaging means is a crescent-shaped plate whose outer arc has a radius with a center offset from the center of the third aperture.

15. The mechanism of claim 14 and further including:
   a second base means having a fourth aperture with a second center and a second means for insertion into the first aperture of the first mounting means of the second control arm and for centering said fourth aperture a preselected distance from the first axis of the second control arm; and
   wherein the second bolt extends through the fourth aperture, the bore of the second control arm and the second aperture of the second mounting plate of the second control arm such that the second bolt lies along a third axis disposed from the first axis of the second control arm.

16. The mechanism of claim 11 wherein the second means is a disk with the third aperture extending therethrough.

17. The mechanism of claim 11 wherein the second means is a crescent-shaped plate whose outer arc has a radius with a center offset from the center of the fourth aperture.

18. The mechanism of claim 11 wherein the first engaging means is attached to the first base means a preselected distance different from the first axis than the preselected distance that the second means for insertion is attached to the second base means from the first axis.

19. The mechanism of claim 15 wherein the first means for insertion into the first aperture of the first mounting plate of the first control arm is attached to the first base means a preselected distance different from the first axis than the preselected distance that the second means for insertion is attached to the second base means from the first axis.

20. A method for adjusting toe angle of a wheel attached to a vehicle by a suspension system that includes first and second control arms attached to the vehicle, each control arm having an end having a bore transversely disposed therein with respect to the axis of the respective control arm, each end being disposed between first and second respective mounting means attached to the underside of the vehicle and a first bolt extending through first and second apertures of first and second mounting means and a second bolt extending through third and fourth apertures of first and second mounting means, each bolt extending through the bore of the respective control arm along first and second axes, respectively, the method comprising:
   disconnecting the first control arm from the first and second mounting means by removing the first bolt;
   positioning a first device having edge portions that engage a rim of the first mounting means such that the device is retained in position, the first device having a first base member and a first aperture engaging means that extends outwardly from the first base member wherein an outer arcuate surface of the first aperture-engaging means abuts against the inner curvature of the first aperture of the first mounting means of the first control arm, the first device having a fifth aperture that lies along a third axis; and reconnecting the first control arm by inserting the first bolt through the fifth aperture and through the bore of the first control arm and through the second aperture of the second mounting means of the first control arm to reconnect the first control arm to the respective first and second mounting means such that the third axis is disposed from the first axis.

21. The method of claim 20 and further including drilling out the first apeture to a larger diameter and wherein the first aperture engaging means is a first disk sufficient in diameter to engage the drilled out first aperture.

22. The method of claim 21 and further comprising:
disconnecting the second control arm from the first and second mounting means by removing the second bolt;
positioning a second device with a second base member and a third aperture engaging means that engages the third aperture of the first mounting means the second device having a sixth aperture that lies along a fourth axis; and
reconnecting the second control arm by inserting the second bolt through the sixth aperture and through the bore of the second control arm and through the fourth aperture of the second mounting means of the second control arm to reconnect the second control arm to the first and second mounting means such that the sixth axis is disposed from the second axis.

23. The method of claim 22 and further including drilling out the third aperture to a larger diameter and wherein the third aperture engaging means is a seocnd disk sufficient in diameter to engage the drilled out third aperture.

24. The method of claim 20 wherein:
the first aperture engaging means is a crescent-shaped plate whose outer arc has a radius with the center offset from the fifth aperture and further including positioning the crescent-shaped plate against a wall surface of the first aperture of the first mounting means; and
enlarging an aperture of the first mounting means of the first control arm obstructing the fifth aperture so that the first bolt can be inserted through the fifth aperture, through the bore of the first control arm and through the second aperture.

25. The method of claim 24 and further comprising:
disconnecting the second control arm from the first and second mounting means by removing the second bolt;
positioning a second device with a second base member and having a third aperture engaging means that engages the third aperture of the first mounting means, the second device having a sixth aperture that lies along a fourth axis; and
reconnecting the second control arm by inserting the second bolt through the sixth apeture and through the bore of the second control arm and through the fourth aperture of the second mounting means of the second control arm to reconnect the second control arm to the first and second mounting means such that the sixth axis is disposed from the second axis.

26. The method of claim 25 wherein:
the third aperture engaging means is a crescent-shaped plate whose outer arc has a radius with a center offset from the sixth aperture and further including positioning the crescent-shaped plate against the wall surface of the first aperture of the first mounting means; and
enlarging an aperture of the first mounting means of the second control arm obstructing the sixth aperture so that the second bolt can be inserted through the sixth aperture, through the bore of the second control arm and through the fourth aperture.

* * * * *